Figure 1:
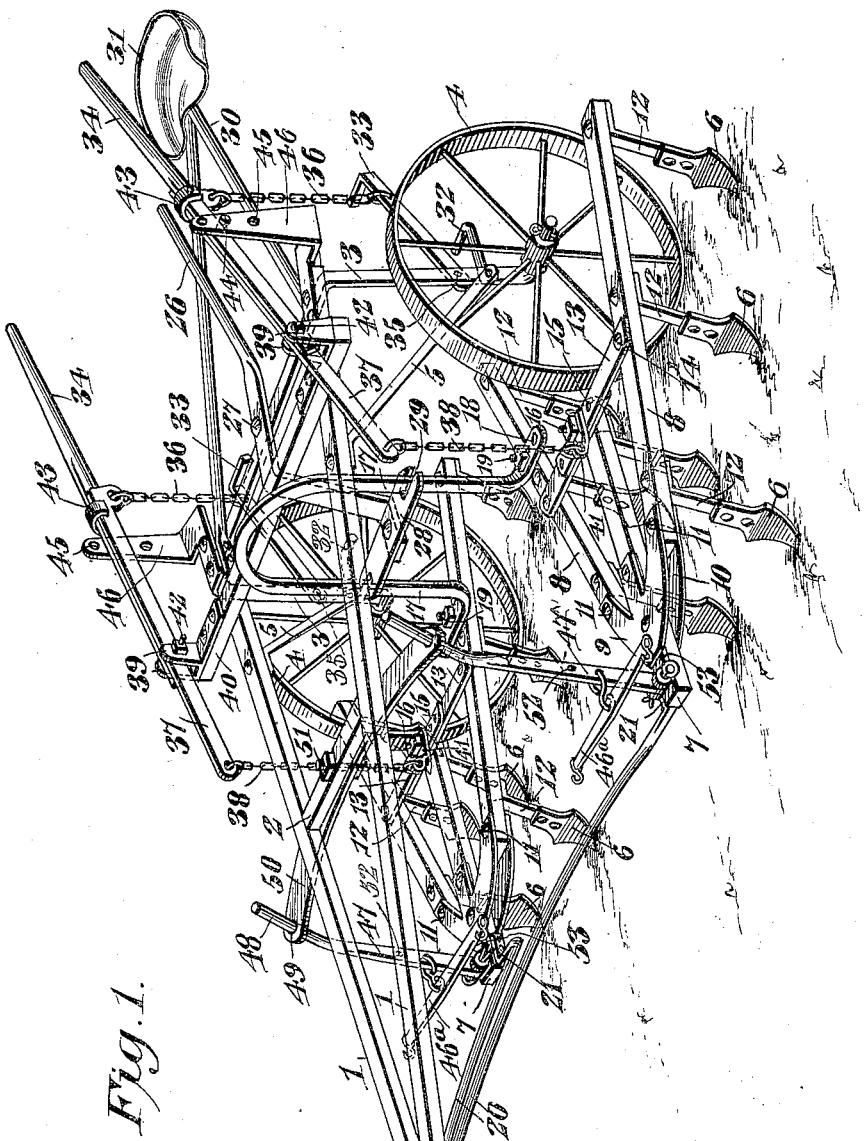

A. BARKLEY.
CULTIVATOR.
APPLICATION FILED APR. 18, 1908.

914,228.

Patented Mar. 2, 1909.
2 SHEETS—SHEET 1.

Witnesses
Jas. F. McCathran
H. F. Riley

Ambrose Barkley,
Inventor

By C. G. Siggers
Attorney

A. BARKLEY.
CULTIVATOR.
APPLICATION FILED APR. 18, 1908.
914,228.
Patented Mar. 2, 1909.
2 SHEETS—SHEET 2.
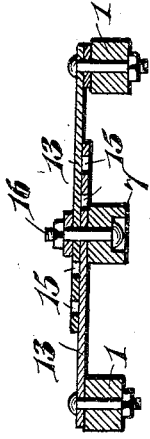
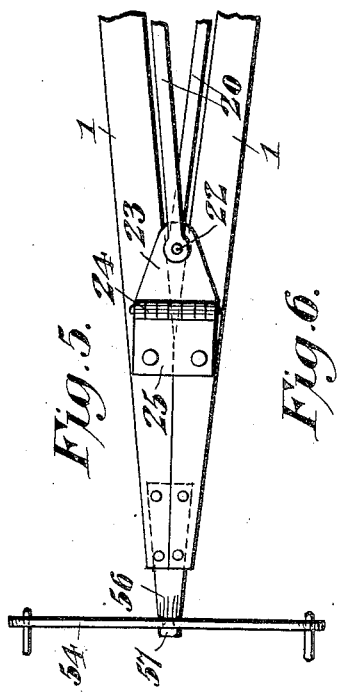
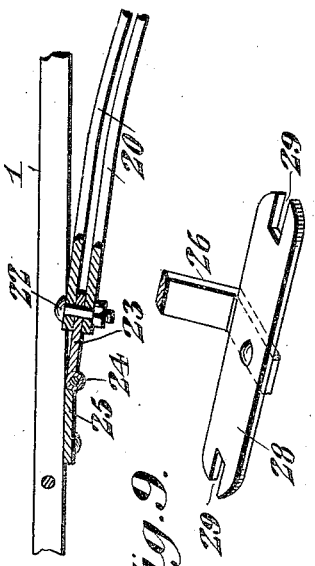
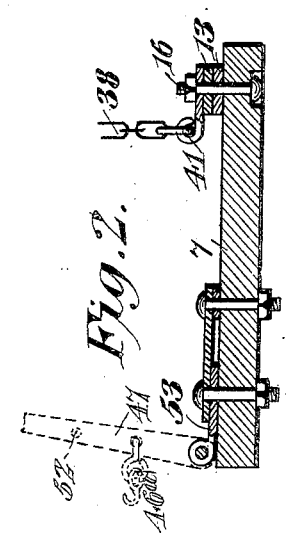
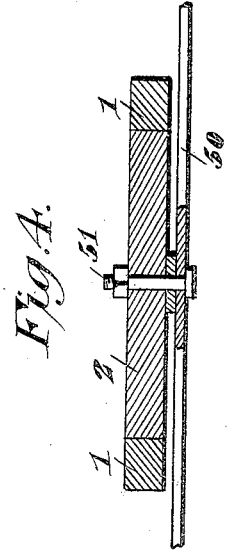
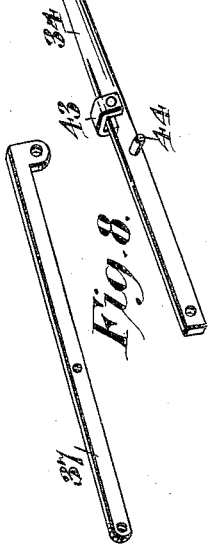
Witnesses
Jas. K. McCathran
H. W. Riley
Ambrose Barkley, Inventor
By C. G. Siggers
Attorney

UNITED STATES PATENT OFFICE.

AMBROSE BARKLEY, OF PIPESTONE, MINNESOTA.

CULTIVATOR.

No. 914,228.  Specification of Letters Patent.  Patented March 2, 1909.

Application filed April 18, 1908. Serial No. 427,825.

*To all whom it may concern:*

Be it known that I, AMBROSE BARKLEY, a citizen of the United States, residing at Pipestone, in the county of Pipestone and State of Minnesota, have invented a new and useful Cultivator, of which the following is a specification.

The invention relates to improvements in cultivators.

The object of the present invention is to improve the construction of cultivators, and to provide a simple and comparatively inexpensive cultivator, capable of straddling a row of plants to cultivate the soil in the space between the same and the adjacent rows, and adapted to permit the driver to occupy a position directly above the row of plants straddled by the machine, whereby the soil at each side of the straddled row of plants will be in full view of the driver and thereby enable him to cultivate the same to greater advantage.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a perspective view of a cultivator, constructed in accordance with this invention. Fig. 2 is a detail sectional view, taken longitudinally of the central beam of one of the gang frames. Fig. 3 is a transverse sectional view, illustrating the construction of the adjustable braces for connecting the side beams with the central beam. Fig. 4 is a detail transverse sectional view, illustrating the manner of mounting the transverse lever of the draft mechanism. Fig. 5 is a reverse plan view of the front portion of the frame of the machine, showing the arrangement of the neck yoke and illustrating the manner of connecting the longitudinal connecting rods with the draft beams of the frame of the cultivator. Fig. 6 is a detail sectional view of the hinge connection between the longitudinal connecting rods and the front ends of the draft beams. Fig. 7 is a detail view of one of the angularly disposed connecting levers. Fig. 8 is a similar view of one of the hand levers for actuating and locking the connecting levers. Fig. 9 is a detail view of the foot of the central shifting lever for moving the gangs of cultivating devices transversely of the machine.

Like numerals of reference designate corresponding parts in all the figures of the drawings.

The frame of the cultivator includes a pair of forwardly converging draft beams 1, secured together at their front ends and connected at an intermediate point by a transverse bar 2, interposed between the draft beams and suitably secured to the same. The rear ends of the draft beams are supported upon and secured to an arched axle 3, provided at the lower ends of the sides of its arched portion with laterally projecting journals, on which are mounted carrying wheels 4. The main frame is braced by inclined rods 5, extending upwardly and forwardly from the lower portions of the sides of the arched portion of the axle to the forwardly converging draft beams and secured to the lower face of the same in advance of the arched axle.

The machine, which is adapted to straddle a row of plants, is equipped with opposite gang frames provided with blades or shovels 6, adapted to cultivate the surface of the soil at opposite sides of the row of plants straddled by the machine. Each gang frame is composed of a short central longitudinal plow beam 7 and rearwardly diverging side beams 8, pivotally connected at their front ends with the central beam by means of upper and lower plates 9 and 10, secured to the upper and lower faces of the central beam and projecting laterally therefrom and forming spaced ears or portions, between which the front ends of the side beams are pivoted by vertical bolts 11, or other suitable fastening devices. The rear end of the central beam is located in advance of the adjacent side or carrying wheel 4 of the cultivator, and the rear portions of the side beams extend rearwardly beyond the rear end of the central beam and are located at the inner and outer sides of the said wheel. These beams are provided with standards 12, to which the said shovels or blades 6 are secured, and any desired number of blades or shovels may be provided, as will be understood. The pivoted side beams are adjustable toward and from the central beam to arrange the cultivating devices to correspond to the width of the space between the rows, and they are secured in their adjustment by transverse connecting bars 13, having overlapped proximate ends and pivoted at their outer ends by bolts 14 to the side beams 8. The inner overlapped portions of the connecting bars 13 are provided at intervals with perforations 15 for the reception of a vertical bolt 16, which also pierces the rear end of the central beam 7. By adjusting the side beams toward and from the central beam, the cultivating devices may be arranged to clear the plants, and to cultivate the soil between the rows without injuring the plants.

The gangs of the cultivating devices are connected by an arch 17, and are adjustable toward and from each other to arrange them the desired distance from the plants and to position them to suit the width of the rows. The lower ends of the arch are provided with laterally projecting arms or portions 18, having perforations and secured to the inner side beams of the gang frames by bolts 19, or other suitable fastening devices. This adjustment of the gangs of cultivating devices toward and from each other, and the individual adjustment of the beams of each gang frame, enable the cultivating devices to be properly positioned to correspond to the width of the rows.

The front ends of the gang frames are connected with the front ends of the draft beams by longitudinal connecting rods 20, converging forwardly from the gang frames and having their rear ends 21 secured to the central beams at the inner faces thereof. The connecting bars are bent laterally and extend inwardly from the front ends of the central beams, and the front ends of the connecting rods are pivoted by a pin 22, or other suitable fastening device to a leaf 23 of a hinge 24, having its other leaf 25 secured to the lower faces of the draft beams 1 at the connected front portions thereof. The rear leaf 23 is free and permits the longitudinal connecting rods to swing upwardly and downwardly to raise and lower the gangs of the cultivating devices, and the pivot or pin 22 permits the connecting bars to swing transversely when the gangs of cultivating devices are adjusted toward and from each other.

The gangs of cultivating devices are adjusted simultaneously in a direction transversely of the cultivator by means of a central operating lever 26, fulcrumed intermediate of its ends on the arched axle at the center thereof by means of a suitable pivot 27 and extending in advance and in rear of the said axle. The front portion of the central longitudinally disposed lever 26 is bent downward, and is provided with a laterally projecting foot 28, consisting of a plate or member having slotted or bifurcated ends 29 receiving the sides of the connecting arch 17. The foot, which is interposed between the sides of the connecting arch, slidably receives the same and permits the gangs of cultivating devices to be raised and lowered independently of the central shifting lever. The central shifting lever enables the operator to cultivate the soil as closely as desired to either side of the row of plants straddled by the machine by shifting the gangs laterally of the row of plants. The central longitudinal adjusting lever is located between a pair of seat standards 30. The seat standards 30 are secured at their front ends to the inner edges of the rear terminals of the draft beams 1, and they extend rearwardly from the frame of the cultivator and support a rear seat 31 for the accommodation of the driver. The arrangement of the seat in this position permits the driver to sit directly above the row of plants straddled by the machine, and he is in a position to see the character of the work performed by the gangs of cultivating devices at each side of the plants. This will enable the driver to perform better work than when occupying a position between two rows of plants. The machine is also equipped with foot rests 32, consisting of approximately L-shaped pieces rigid with the sides of the arched portion of the axle and extending rearwardly therefrom, as clearly shown in Fig. 1 of the drawings.

The gangs of cultivating devices are raised and lowered by means of foot levers 33 and hand levers 34. The foot levers, which are fulcrumed at their front ends 35 on the axle at the sides of the arched portion, extend rearwardly therefrom and are connected near their rear ends by chains 36, or other suitable flexible connections with the rear ends of angularly disposed levers 37, fulcrumed at an intermediate point on the frame of the machine at opposite sides thereof, and connected at their front ends by chains 38 with the gangs of cultivating devices. The angularly disposed levers, which converge rearwardly, are pivoted between upwardly extending ears or arms 39, mounted on a rear transverse bar 40, which is secured to the draft beams of the main frame near the rear ends thereof. The chains 38, which extend downwardly from the front ends of the longitudinal levers, are connected with the gang frames by plates or members 41, secured to the rear ends of the central beams 7 by the bolts 16, and provided at their front ends with eyes, which are linked into rings carried by the lower ends of the chains. Any other suitable means, however, may be employed for connecting the front ends of the angularly disposed levers with the gang frames. The rear terminals of the foot levers are bent laterally and extend inwardly and are adapted to be engaged by the feet of the operator. When either of the foot levers is depressed, the angularly disposed lever with which it is connected lifts the gang frame at that side of the machine.

The hand levers 34, which extend rearwardly beyond the connecting levers, are fulcrumed at their front ends with bolts 42, which pivot the connecting levers to the ears 39, and the said hand levers are provided at points intermediate of their ends with laterally projecting hook-shaped lugs 43, arranged to engage the upper edges of the connecting levers at the rear ends thereof, whereby the rear arms of the connecting levers are swung downward when the hand levers are depressed. The hand levers are also provided at their outer sides with laterally projecting studs 44, adapted to engage perforations 45 of vertical standards 46, mounted on the main frame, and having horizontal plates or portions secured to the upper faces of the draft beams at the rear ends thereof. The studs of the hand levers are adapted through their engagement with the standards to lock the gangs of cultivating devices against downward movement. The foot levers are adapted to be operated independently of the hand levers to lift the gangs of cultivating devices from the ground, and when the foot levers are permitted to swing upward, the downward movement of the cultivating devices will be limited by the hand levers through their engagement with the connecting levers.

The cultivator is designed to be actuated by a pair of horses, hitched to draft elements, which, in the accompanying drawings, are in the form of whiffletrees 46ª, connected with substantially vertical levers 47, pivoted at their lower ends to the gang frames at the front ends of the central beams and having reduced rounded upper portions 48, which are arranged in perforations 49 of a transverse lever 50. The rounded upper portions 48 are slidable in the openings of the transverse lever to permit the gang frames to be raised and lowered independently of the transverse lever. The transverse lever 50, which extends across and projects beyond the forwardly converging draft beams, is centrally pivoted to the transverse bar 2 by a bolt 51. Any other suitable means can be employed for pivotally connecting the upper ends of the substantially vertical lever with the terminals of the transverse lever 50, and the said vertical levers are provided at intermediate points with a plurality of perforations 52 for the adjustment of the draft elements or whiffletrees. The front ends of the central beams 7 are equipped with plates 53, provided with ears between which the lower ends of the upright levers are pivoted. The draft animals are connected with the main frame by means of a neck yoke 54, located at the front ends of the forwardly converging draft beams and connected to the same by means of a plate or member 55, having a forwardly extending arm or portion 56, provided with a terminal pivot 57, which pierces the neck yoke.

Having thus fully described my invention, what I claim as new and desire to secure by Letters Patent, is:—

1. A cultivator including a frame provided at opposite sides with wheels, and gang frames carried by the said frame and each composed of a central beam located in advance of the adjacent side wheel, and side beams extending rearwardly beyond the central beam and having its rear portions located at the inner and outer faces of the said wheel.

2. A cultivator including a frame provided at opposite sides with wheels, and gang frames carried by the said frame and each composed of a central beam located in advance of the adjacent side wheel, and side beams extending rearwardly beyond the central beam and having its rear portions located at the inner and outer faces of the said wheel, said beams being pivotally connected at their front ends, and means for adjustably connecting the side beams with the rear portion of the central beam.

3. A cultivator including a main frame provided at opposite sides with wheels, gang frames located at opposite sides of the main frame and carried by the same, each gang frame being composed of a central and side beams, the central beam being located in advance of the adjacent wheel and the side beams being extended rearwardly at the inner and outer faces of the wheel, upper and lower plates secured to the central beam at the front end thereof and projecting laterally therefrom and having the front ends of the side beams pivoted between them, and adjustable bars or members connecting the side beams with the central beam.

4. A cultivator including a main frame provided at opposite sides with wheels, gang frames carried by the main frame and located at opposite sides thereof in advance of the wheels, each gang frame being composed of rearwardly diverging beams adjustably connected together, means for connecting the front portions of the gang frames with the main frame, and means located at the rear portions of the gang frames for adjustably connecting the same with each other.

5. A cultivator including a main frame, gang frames carried by the main frame and each composed of central and side beams, the central beam being located in advance of the adjacent wheel, and the side beams being pivotally connected with and extending rearwardly beyond the central beam at opposite sides of the said wheel, means for adjustably connecting the central and side beams, and separate means for adjustably connecting the inner side beams of the gang frames.

6. A cultivator including a main frame, gang frames located at opposite sides of the main frame and having their front portions pivotally connected with the same, an arch connecting the rear portions of the main frame, and a shifting lever fulcrumed on the main frame and connected with the arch for moving the gang frames transversely of the cultivator and permitting an independent vertical movement of the gang frames and the connecting arch.

7. A cultivator including a main frame, gang frames having their front portions pivotally connected with the main frame and movable upwardly and downwardly and also transversely of the main frame, an arch provided with laterally projecting arms adjustably secured to the gang frames, said arch forming a rigid connection between the gang frames, and means for adjusting the arch transversely of the cultivator without interfering with the independent vertical movement of the gang frames and the connecting arch.

8. A cultivator including a main frame, spaced gang frames carried by the main frame, an arch connecting the gang frames, and a shifting lever provided with a foot located between the sides of the arch and slidably connected with the same to permit the gang frames to be raised and lowered.

9. A cultivator including a main frame, gang frames carried by the main frame and spaced apart, an arch connecting the gang frames, and a shifting lever provided with a foot arranged between the sides of the arch having terminal slots receiving the said sides to permit the gang frames to be raised and lowered independently of the shifting lever.

10. A cultivator including a main frame, a seat provided with standards connected with the main frame at spaced points, gang frames pivotally connected at their front ends with the main frame, an arch rigidly connecting the rear portions of the gang frames, and a longitudinal lever fulcrumed on the main frame and connected with the arch and operable between the standards for adjusting the gang frames.

11. A cultivator including a main frame, opposite gang frames, connecting levers fulcrumed on the frame at opposite sides thereof and having front and rear arms, the front arms being connected with the gang frames, foot levers mounted on the main frame and connected with the rear arms of the connecting levers, and hand levers provided with means for detachably engaging the connecting levers, said means permitting an independent operation of the connecting levers by the foot levers.

12. A cultivator including a main frame, gang frames, levers fulcrumed at an intermediate point and connected at one arm with the gang frames, foot levers connected with the other arm of each connecting lever, and hand levers provided with means for operating the connecting levers.

13. A cultivator including a main frame, gang frames, levers fulcrumed at an intermediate point and connected at one arm with the gang frames, foot levers connected with the other arm of each connecting lever, and hand levers provided with means for engaging the connecting levers and for locking the same against movement in one direction, said connecting levers being movable in the opposite direction by the foot levers.

14. A cultivator including a main frame, gang frames, levers fulcrumed at an intermediate point and connected at one arm with the gang frames, foot levers connected with the other arm of each connecting lever, and hand levers provided with laterally projecting lugs engaging over the upper edges of the connecting levers.

15. A cultivator including a main frame, gang frames, connecting levers fulcrumed at an intermediate point and having one arm connected with the gang frames, hand levers provided with means for detachably engaging the other arm of the connecting levers for limiting the movement of the same in one direction, and foot levers connected with the connecting levers for moving the same in the opposite direction.

16. A cultivator including a main frame, gang frames, connecting levers fulcrumed at an intermediate point and having one arm connected with the gang frames, hand levers provided with means for detachably engaging the other arm of the connecting levers for limiting the movement of the same in one direction, foot levers connected with the connecting levers for moving the same in the opposite direction, and means for locking the hand levers in their adjustment.

17. A cultivator including a main frame, gang frames, longitudinal connecting levers fulcrumed at an intermediate point and connected at their front arms with the gang frames, hand levers extending longitudinally of the rear arms of the connecting levers and provided with means for engaging the rear arms of the connecting levers to hold the same against upward movement, and foot controlled mechanism for swinging the rear arms of the connecting levers downwardly independently of the hand levers.

18. A cultivator including a main frame provided with standards, gang frames, longitudinally connecting levers fulcrumed at an intermediate point on the main frame and having their front arms connected with the gang frames, hand levers fulcrumed on the main frame and extending longitudinally of the rear arms of the connecting levers and provided with means for engaging the upper edge of the same, and coöperating means on the standards and on the hand levers for locking the latter in their adjustment.

19. A cultivator including a main frame provided with standards having perforations, gang frames, longitudinally connecting levers fulcrumed at an intermediate point on the main frame and having their front arms connected with the gang frames, hand levers fulcrumed on the main frame and extending longitudinally of the rear arms of the connecting levers and provided with means for engaging the upper edge of the same, and studs projecting from the hand levers for engaging the perforations of the standards to lock the hand levers in their adjustment.

20. A cultivator including a main frame, gang frames, means for raising and lowering the gang frames and for adjusting the same transversely of the cultivator, and longitudinal connecting means secured at their rear ends to the gang frames and pivotally connected at their front ends with the main frame.

21. A cultivator including a main frame, gang frames, means for raising and lowering the gang frames and for moving the same transversely of the cultivator, a hinge element carried by the main frame and arranged to swing upward and downward, and longitudinal connecting bars pivoted at their front ends to the said hinge element and secured at their rear ends to the gang frames.

22. A cultivator including a main frame having forwardly converging draft beams connected together, a hinge element connected with the front portions of the draft beams at the lower faces thereof and arranged to swing upward and downward, and longitudinal connecting rods pivoted at their front ends to the hinge element and diverging rearwardly therefrom and rigidly secured at their rear ends to the gang frames.

23. A cultivator including a main frame, gang frames, a transverse lever fulcrumed on the main frame and extending across the same, upright levers pivoted at their lower ends to the gang frames and movably connected with the transverse lever, and draft elements connected with the upright levers at points between the gang frames and the transverse lever.

24. A cultivator including a main frame, gang frames, a transverse lever fulcrumed on the main frame, upright levers pivotally connected with the gang frames and having their upper portions movably connected with and slidable on the transverse levers, and draft elements connected with the upright levers.

25. A cultivator including a main frame, gang frames, a transverse lever fulcrumed on the main frame and provided with openings, upright levers pivoted to the gang frames and having upper portions slidable in the said openings, and draft elements connected with the upright levers.

26. A cultivator including a main frame, gang frames located at opposite sides of the main frame, a transverse lever fulcrumed on the main frame and having projecting portions provided with terminal openings, upright levers pivoted at their lower ends to the gang frames and provided with rounded upper portions slidable in the said openings, and draft elements adjustably connected with the upright levers between the transverse lever and the gang frames.

27. A cultivator including a main frame provided with forwardly converging draft beams, gang frames located at opposite sides of the main frame, a transverse lever fulcrumed on the main frame, upright levers connected with the gang frames and having upper portions slidable on the transverse lever, draft elements connected with the upright levers, a pivot carried by the front ends of the draft beams, and a neck yoke mounted on the said pivot.

28. A cultivator including a main frame, spaced gang frames carried by the main frame, an arch connecting the gang frames, means for raising and lowering the gang frames, and means engaging the arch for shifting the gang frames laterally, said shifting and raising and lowering means being independently operable without affecting each other.

29. A cultivator including a main frame, gang frames, upright levers pivotally connected at their lower ends to the gang frames, means carried by the main frame for slidably receiving and guiding the upper portions of the said levers, and draft elements connected with the upright levers at points between the gang frames and the said guiding means.

In testimony, that I claim the foregoing as my own, I have hereto affixed my signature in the presence of two witnesses.

AMBROSE BARKLEY.

Witnesses:
R. W. ASHTON,
M. S. CRAIG.